(12) United States Patent
Tysak

(10) Patent No.: US 8,986,791 B2
(45) Date of Patent: *Mar. 24, 2015

(54) LOW GLOSS AQUEOUS COATING COMPOSITIONS CONTAINING POLY(ETHYLENE OXIDE) FOR USE ON LEATHER

(75) Inventor: Theodore Tysak, Ambler, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/606,107

(22) Filed: Sep. 7, 2012

(65) Prior Publication Data

US 2013/0071572 A1 Mar. 21, 2013

Related U.S. Application Data

(60) Provisional application No. 61/535,073, filed on Sep. 15, 2011.

(51) Int. Cl.
*B05D 3/02* (2006.01)
*C09D 133/08* (2006.01)
*C09D 133/10* (2006.01)
*C08K 5/06* (2006.01)
*C14C 11/00* (2006.01)
*B05D 7/12* (2006.01)

(52) U.S. Cl.
CPC ............ *C09D 133/08* (2013.01); *C09D 133/10* (2013.01); *C08K 5/06* (2013.01); *C14C 11/003* (2013.01); *B05D 7/12* (2013.01); *B05D 2401/20* (2013.01); *B05D 2504/00* (2013.01); *C08L 2201/54* (2013.01)
USPC ........ 427/389; 427/384; 427/385.5; 252/8.57

(58) Field of Classification Search
CPC .... C09D 133/10; C09D 133/08; C08L 23/12; C08L 23/06; C08L 71/02; C08L 2201/54; C08K 5/06; C14C 11/003; B05D 7/12; B05D 2504/00; B05D 2401/20

USPC ............ 427/389, 384, 385.5; 252/8.57
See application file for complete search history.

(56) References Cited

U.S. PATENT DOCUMENTS

| | | | |
|---|---|---|---|
| 2,795,564 A | 6/1957 | Conn et al. | |
| 3,328,325 A | 6/1967 | Zdanowski | |
| 3,467,610 A | 9/1969 | Fiarman et al. | |
| 3,554,790 A | 1/1971 | Gehman et al. | |
| 3,573,329 A | 3/1971 | Lynn | |
| 3,711,436 A | 1/1973 | Oliver et al. | |
| 3,808,036 A | 4/1974 | Zdanowski | |
| 3,930,921 A | 1/1976 | Connett | |
| 4,150,005 A | 4/1979 | Gehman et al. | |
| 4,374,872 A | 2/1983 | Eckert et al. | |
| 4,517,330 A | 5/1985 | Zdanowski et al. | |
| 5,002,584 A | 3/1991 | Tork et al. | |
| 5,061,517 A | 10/1991 | Speer | |
| 5,149,745 A | 9/1992 | Owens et al. | |
| 5,319,018 A | 6/1994 | Owens et al. | |
| 5,439,970 A * | 8/1995 | Reeb .............................. | 524/558 |
| 5,574,090 A | 11/1996 | Gray et al. | |
| 5,676,741 A | 10/1997 | Gray et al. | |
| 5,872,182 A | 2/1999 | Duan et al. | |
| 6,548,596 B1 | 4/2003 | Kohr et al. | |
| 6,579,923 B2 * | 6/2003 | Yarmy et al. ................... | 524/262 |
| 7,842,129 B2 | 11/2010 | Christian et al. | |
| 2001/0022964 A1 * | 9/2001 | Leung et al. ..................... | 424/49 |
| 2002/0086936 A1 * | 7/2002 | Eoga .............................. | 524/612 |

FOREIGN PATENT DOCUMENTS

| | | | | |
|---|---|---|---|---|
| EP | 0761778 A1 | 3/1997 | | |
| JP | 07331117 A | 12/1995 | | |
| JP | 09176519 A | 7/1997 | | |
| JP | 2001214120 A | 8/2001 | | |
| JP | 2005112968 A | 4/2005 | | |
| JP | 2011168770 A | 9/2011 | | |
| WO | WO 2011/073115 | * | 6/2011 | ............... A23B 7/16 |

* cited by examiner

Primary Examiner — Robert S Walters, Jr.
(74) Attorney, Agent, or Firm — Cantor Colburn LLP

(57) ABSTRACT

The present invention relates to aqueous coating compositions having low gloss for treating natural or synthetic leather. These aqueous coating compositions contain one or more water soluble poly(ethylene oxide) resins having the general formula [—$CH_2CH_2O$—]$_n$ and one or more polymer binders.

13 Claims, No Drawings

LOW GLOSS AQUEOUS COATING COMPOSITIONS CONTAINING POLY(ETHYLENE OXIDE) FOR USE ON LEATHER

FIELD OF THE INVENTION

The present invention relates to aqueous coating compositions having low gloss for application to leather. These aqueous coating compositions contain one or more water soluble poly(ethylene oxide) resins to reduce gloss.

BACKGROUND OF THE INVENTION

Natural and synthetic leather are used to make many useful products such as clothing, shoes, luggage, automobile interiors, upholstery, wallets, cases for eyeglasses and other things, handbags and belts, to name but a few. It is beneficial to treat leather to protect it from scuffing, scratching, flexing, humidity and cracking. In addition to protection from the aforesaid damages, it is also desirable for such coatings to provide a continuous film or coating having good visual and aesthetic properties such as surface smoothness (also known as "hand" or "handle"), non-tacky surface, homogenous color and texture, and appropriate gloss level.

Various methods of treating leather are known. Typically, such treatments consist of applying a coating to the outer or upper surface of the leather substrate with one or more compositions which are selected depending upon the specific characteristics required for the intended use of the leather. There are also multiple acceptable techniques for applying such compositions to leather substrates, including brushing, rolling, spraying, swabbing, flow coating and laminating. The application technique is, of course, selected depending on the nature of the coating composition and the type of leather product to be made of the coated leather.

Some leather coating compositions are made of casein, a protein derived from milk, that is cured with formaldehyde or glutaraldehyde, or even first mixed with alkoxy alkyl ureas and then cured with an acid catalyst (see, e.g., U.S. Pat. No. 4,374,872). Nitrocellulose lacquer is another widely used material for coating leather substrates, but requires pre-treatment with an adhesive layer to bind to the leather and typically results in a hard, non-tacky, glossy finish. U.S. Pat. No. 3,930,921 describes a two-layer coating for leather substrates having a top nitrocellulose lacquer layer and a sub-layer of cross-linked polyacrylate resin which eliminates the need for adhesive pretreatment. Polyurethane is also commonly used for providing a protective coating for leather substrates. For example, U.S. Pat. No. 5,061,517 discloses a brush-on composition for footwear and other leather products that comprises a polyurethane elastomer in toluene and isopropyl alcohol solvent mixture and which provides a thin, flexible, scuff-resistant coating. U.S. Pat. No. 5,872,182 describes one- and two-component water-based sulfonated polyurethane compositions for use as an adhesive, coating and primer for footwear and other leather products. Generally, from a health, environmental and safety standpoint, aqueous-based coating compositions are currently preferred over organic solvent-based compositions because they have reduced or even zero volatile organic compound (VOC) emissions.

Additional components, such as colorants, plasticizers, thickeners, gloss control agents and plasticizers, among others, are often added to leather coating compositions to modify certain characteristics otherwise imparted by the coating composition. For example, plasticizers are often added to lacquer compositions to make the lacquer coating more flexible, but this sometimes results in surface tackiness over time (see U.S. Pat. No. 5,061,517). U.S. Pat. No. 5,061,517 acknowledges the possibility that additional components may be included in leather coating compositions, for various purposes.

Depending on the product or use to be made of the treated leather, high gloss or low gloss may be preferred. When gloss control is employed, it remains important to control or maintain other desirable characteristics such as flexibility, scratch resistance and impact resistance.

One way to lower gloss has been to add matting agents, which are either inorganic particles, such as, for example, silica, or calcium carbonate particles, or organic particles, such as, for example, polyurethane dispersions, that function by roughening the surface of the film, or water dispersed acrylic acid dispersants which function to coagulate and disrupt film formation. For example, U.S. Pat. No. 5,002,584 describes a seasoning (top) coating for leather substrates which comprises cellulose acetobutylate or polyether siloxane, and to which has been added matting agents comprising silicone dioxide or aluminum oxide. U.S. Pat. No. 7,842,129 discloses a transparent lacquer formulation for coating wood, metals, plastics, and natural and synthetic leathers that comprises silicon dioxide matting agents. While effective at reducing gloss, such matting particles often disrupt film integrity and can lead to loss of key film properties such as water and abrasion resistance, slip, etc. Still further, the matting particles tend to polish or burnish after rubbing, leading to an increase in the gloss over time. Inorganic matting particles also tend then to settle out of solution.

Others have unsuccessfully attempted to overcome the problems associated with the use of matting particles by controlling of particle size, minimizing random light scattering, careful selection of refractive index between particle and matrix, or modifying the matrix or film forming polymer. However, such approaches sacrifice clarity or film properties for matte effect and can greatly limit the scope of useful compositions.

The present invention provides aqueous coating compositions having low gloss for application to leather substrates.

SUMMARY OF THE INVENTION

The present invention provides an aqueous coating composition for treating leather. The composition comprises: A) 1 to 95% by weight of an aqueous solvent comprising water; B) 5 to 80% by weight of a polymer binder; and C) 0.05 to 10% by weight of a water soluble poly(ethylene oxide) resin having the general formula $[-CH_2CH_2O-]_n$, wherein n=1,000-200,000. The water soluble poly(ethylene oxide) resin comprises polymerized units derived from ethylene oxide, or derived from ethylene oxide and propylene oxide. The water soluble poly(ethylene oxide) resin has a weight average molecular weight of from 50,000 to 8,000,000.

The polymer binder may be a polymer comprising polymerized units derived from one or more ethylenically unsaturated monomers.

The present invention also provides a method for providing a low gloss coating to natural or synthetic leather, comprising applying one or more layers to a leather substrate of the above-described aqueous coating composition, and allowing each layer to dry prior to use or application of another layer.

DETAILED DESCRIPTION OF THE INVENTION

The present invention relates to aqueous coating compositions useful as matte (low gloss) coatings for leather substrates and which retain desired degrees of flexibility, scratch resistance and impact resistance. The aqueous coating compositions comprise an aqueous solvent comprising water, a water soluble poly(ethylene oxide) resin and a film-forming or binding polymer (hereinafter referred to as the "polymer binder").

It is noted that in the following description, endpoints of ranges are considered to be definite and are recognized to incorporate within their tolerance other values within the knowledge of persons of ordinary skill in the art, including, but not limited to, those which are insignificantly different from the respective endpoint as related to this invention (in other words, endpoints are to be construed to incorporate values "about" or "close" or "near" to each respective endpoint). The range and ratio limits, recited herein, are combinable. For example, if ranges of 1-20 and 5-15 are recited for a particular parameter, it is understood that ranges of 1-5, 1-15, 5-20, or 15-20 are also contemplated and encompassed thereby.

All percentages stated herein are weight percentages, unless otherwise stated. "Polymer," as used herein, means a polymeric compound prepared by polymerizing monomers, whether of the same or a different type. The generic term "polymer" includes the terms "homopolymer," "copolymer," "terpolymer" as well as "interpolymer." Also, as used herein, the terms "resin" and "polymer" are synonymous.

The term "polymerized units derived from" as used herein refers to polymer molecules that are synthesized according to polymerization techniques wherein a product polymer contains "polymerized units derived from" the constituent monomers which are the starting materials for the polymerization reactions.

Typically, the poly(ethylene oxide) ("PEO") resins suitable for use in the present invention and described in further detail hereinafter, comprise polymerized units derived from ethylene oxide. They may also comprise units derived from other monomers such as propylene oxide, in addition to ethylene oxide. The poly(ethylene oxide) ("PEO") resins are soluble in water and provide essentially clear, homogeneous compositions when dispersed in water. Surprisingly, when coating compositions, such as film forming compositions, are formulated containing these resins applied to a substrate, the dried coatings appear matte or opaque.

More particularly, water soluble poly(ethylene oxide) resins suitable for use in the present invention have the general formula [—CH$_2$CH$_2$O—]$_n$, wherein n=1,000-200,000, for example, 1,000-100,000, or even 1,000 to 50,000. The poly(ethylene oxide) resins may have a solubility in water of from 0.1% to 100%, at 20° C. and atmospheric pressure. Furthermore, suitable water soluble poly(ethylene oxide) resin components have a weight average molecular weight, MW$_w$, of 50,000 to 8,000,0000 grams per mole (g/mol), such as 75,000 to 4,000,000 g/mol, or even 100,000 to 1,000,000 g/mol.

Methods for preparing water soluble poly(ethylene oxide) resins suitable for use in the aqueous coating compositions of the present invention are familiar to persons of ordinary skill in the relevant art and are not particularly limited. For example, heterogeneous coordination anionic polymerization of ethylene oxide in non-solvent diluents, in the presence of a catalyst, would be suitable for preparation of water soluble poly(ethylene oxide) resins. Catalysts known to facilitate such anionic polymerization including bases such as hydroxides, carbonates or other compounds of alkali or alkaline earth metals, or even those based on zinc. Additionally, cationic polymerization of ethylene oxide may be performed to obtain water soluble poly(ethylene oxide) resins, in the presence of catalysts including protonic acids (HClO$_4$, HCl), Lewis acids (SnCl$_4$, BF$_3$, etc.), organometallic compounds, or more complex reagents. It is also possible to prepare water soluble poly(ethylene oxide) resins from ethylene oxide by a ring-opening polymerization process using organo-metallic catalysts. Of course, where resins comprising polymerized units derived from ethylene oxide and another monomer, such as propylene oxide, is desired, both types of monomers should be present in the reactant mixture undergoing polymerization.

Poly(ethylene oxide) resins found to be successful for modifying the gloss/appearance of aqueous coating compositions include POLYOX™ water-soluble resins, which are nonionic, high molecular weight water-soluble poly(ethylene oxide) polymers, commercially available from The Dow Chemical Company of Midland, Mich., U.S.A. The different types and concentrations of suitable POLYOX compounds include, without limitation, POLYOX WSR N-10, POLYOX WSR N-80, POLYOX WSR N-750, POLYOX WSR N-3000, POLYOX WSR-205, POLYOX WSR-1105, POLYOX WSR N-12K, POLYOX WSR-301, POLYOX WSR Coagulant, POLYOX WSR-303, POLYOX WSR-308, UCARFLOC™ Polymer 300, UCARFLOC Polymer 302, UCARFLOC Polymer 304, UCARFLOC Polymer 309. For reference, representative POLYOX resins are listed in TABLE 1 below with their weight average molecular weights.

TABLE 1

| Type of POLYOX | Weight Average Molecular Weight* |
|---|---|
| Polyox WSR N-10 | 100,000 |
| Polyox WSR N-80 | 200,000 |
| Polyox WSR N-750 | 300,000 |
| Polyox WSR N-3000 | 400,000 |
| Polyox WSR N-12K | 1,000,000 |
| Polyox WSR N-60K | 2,000,000 |
| Polyox WSR-205 | 600,000 |
| Polyox WSR-301 | 4,000,000 |

*Based on rheological measurements.

Other commercially available poly(ethylene oxide) resin materials which may be suitable to enhance gloss control properties when formulated into coating compositions include, without limitation, ALKOX® resins from Meisei Chemical Works, LTD, of Kyoto, Japan. The ALKOX® resins have molecular weights ranging between 100,000 and 8,000,000. Particular examples of ALKOX® resins believed to be suitable are, for example, ALKOX R-150, ALKOX R-400, ALKOX R-1000, ALKOX E-30, ALKOX E-45, ALKOX E-60, ALKOX E-75, ALKOX E-100, ALKOX E-130, ALKOX E-160, ALKOX E-240, ALKOX E-300, ALKOX L-6, ALKOX L-8, ALKOX L-11 Additionally, the PEO® Water-Soluble Thermoplastic Resins such as PEO-27, PEO-18Z, PEO-15Z, PEO-8Z, PEO-4, PEO-3Z, PEO-2, PEO-1Z, available from Sumitomo Seika Chemicals Co., Ltd., of Osaka, Japan, are believed to be suitable water soluble poly(ethylene oxide) resins for use in the coating compositions of the present invention.

It is further noted that water soluble PEO resin materials which are copolymers of ethylene oxide with propylene oxide may also be suitable for enhancing gloss control properties in the coating compositions of the present invention. Such copolymers of ethylene oxide and propylene oxide include, without limitation, ALKOX resins such as ALKOX EP-10 and ALKOX EP-20, which are commercially available from Meisei Chemical Works, LTD, of Kyoto, Japan.

Aqueous coating compositions in accordance with the present invention typically also comprise a film-forming or binder polymer. Polymer binders suitable for use in the aqueous coating compositions are water insoluble emulsion polymers derived from one or more ethylenically unsaturated monomers. The water insoluble emulsion polymers may also comprise one or more of the following components: acid functional residues, polyvalent metal ion and complex crosslinking agents. Such polymer binders are described in, for example, U.S. Pat. Nos. 2,795,564, 3,328,325, 3,467,610, 3,554,790, 3,573,329, 3,711,436, 3,808,036, 4,150,005, 4,517,330, 5,149,745, 5,319,018, 5,574,090, 5,676,741 and 6,548,596.

Water insoluble polymer binders suitable for use in the present invention have glass transition temperatures, $T_g$, from −1 to 120° C., such as from 25° C. to 90° C., or from 40° C. to 80° C., or even from 50° C. to 75° C. The "glass transition temperature," or "$T_g$," as used herein, means the temperature at or above which a glassy polymer will undergo segmental motion of the polymer chain. Glass transition temperatures of a polymer can be estimated by the Fox Equation (Bulletin of American Physics Society, 1 (3), p 123, 1956), as follows:

$$1/T_g = w_1/T_{g,1} + w_2/T_{g,2}$$

For a copolymer comprising two type of monomers, $w_1$ and $w_2$ refer to the weight fraction of the two monomers, and $T_{g,1}$ and $T_{g,2}$ refer to the glass transition temperatures of the two corresponding homopolymers made from the monomers. For polymers containing three or more monomers, additional terms are added ($w_n/T_{g,n}$). The $T_g$ of a polymer can also be measured by various techniques including, for example, differential scanning calorimetry (DSC).

Methods for preparation of the water insoluble polymer binders suitable for use in the coating composition of the present invention are known in the art and not especially limited. The preparation method may be selected from solution, dispersion and emulsion polymerization processes. Emulsion polymerization is especially useful for preparing useful polymer binders. The practice of emulsion polymerization is well known and discussed in detail in the literature, for example, in D. C. Blackley, *Emulsion Polymerization* (Wiley, 1975). The polymerization temperature is typically from ambient temperature up to 90° C. and may also involve use of dispersing agents, initiators, accelerators, emulsifiers, chain transfer agents. As will be readily understood by persons of ordinary skill, dispersing agents may include anionic or nonionic dispersing agents, polymerization initiators may be of the free radical type, such as ammonium or potassium persulphate. The initiators may be used alone or with an accelerator, such as potassium metabisulphite or sodium thiosulphate. Examples of suitable emulsifiers include, for example, alkaline metal and ammonium salts of alkyl, aryl, alkaryl and aralkyl sulphonates, sulphates, polyether sulphates, and alkoxylated derivatives of fatty acids, esters, alcohols, amines, amides and alkylphenols. Chain transfer agents, including mercaptans, polymercaptans and polyhalogen compounds may be used in the polymerization mixture to control molecular weight of the polymer.

Suitable water insoluble polymer binders may contain, as polymerized units, from 5% to 90%, such as from 5% to 80%, from 5% to 50%, or even from 10 to 20%, of one or more monoethylenically unsaturated monomers containing an acidic functional group selected from one or more of carboxylic, sulfonic and phosphonic groups. For example, suitable carboxylic acid monomers include, without limitation, monoethylenically unsaturated ($C_3$-$C_9$) carboxylic acid monomers, such as unsaturated monocarboxylic and dicarboxylic acid monomers. For example, unsaturated monocarboxylic acids include acrylic acid (AA), methacrylic acid (MAA), alpha-ethacrylic acid, beta-dimethylacrylic acid, vinylacetic acid, allylacetic acid, ethylidineacetic acid, propylidineacetic acid, crotonic acid, acryloxypropionic acid and alkali and metal salts thereof. Suitable unsaturated dicarboxylic acid monomers include, for example, maleic acid, maleic anhydride, fumaric acid, itaconic acid, citraconic acid, mesaconic acid, methylenemalonic acid and alkali and metal salts thereof.

Additional suitable monoethylenically unsaturated monomers containing sulfonic acid or phosphonic groups include, for example, 2-acrylamido-2-methyl-1-propane-sulfonic acid, 2-methacrylamido-2-methyl-1-propanesulfonic acid, 3-methacryl-amido-2-hydroxypropanesulfonic acid, allylsulfonic acid, methallylsulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrene-sulfonic acid, vinylsulfonic acid, 2-sulphoethyl methacrylate, 3-sulfopropyl acrylate, 3-sulfopropyl methacrylate, sulfomethyl acrylamide, sulfomethyl methacrylamide and phosphoethyl methacrylate.

As a further example, the one or more monoethylenically unsaturated monomers may comprise one or more (meth) acrylic monomers containing one or more pendant reactive functional groups selected from hydroxy, thiol, and amino groups. Suitable hydroxy-functional (meth)acrylic monomers include, for example, hydroxyl ($C_1$-$C_4$)alkyl (meth) acrylates, such as hydroxyethyl methacrylate, hydroxyethyl acrylate, hydroxypropyl methacrylate and hydroxypropyl acrylate. Suitable amino-functional (meth)acrylic monomers include, for example, dimethylaminopropyl methacrylamide, dimethylaminopropyl acrylamide, dimethylaminoethyl methacrylate, dimethylaminoethyl acrylate, dimethyl-aminopropyl methacrylate and dimethylaminopropyl acrylate. Suitable thiol-functional (meth)acrylic monomers include, for example, 2-mercaptopropyl methacrylate.

As a still further example, the one or more monoethylenically unsaturated monomers may comprise one or more ($C_1$-$C_{20}$)alkyl (meth)acrylate ester monomers, such as, without limitation, methyl acrylate, ethyl acrylate, propyl acrylate, isopropyl acrylate, butyl acrylate, isobutyl acrylate, secondary butyl acrylate, tertiary-butyl acrylate, methyl methacrylate, ethyl methacrylate, propyl methacrylate, isopropyl methacrylate, cyclopropyl, methacrylate, butyl methacrylate and isobutyl methacrylate, hexyl and cyclohexyl methacrylate, cyclohexyl acrylate, isobornyl methacrylate, 2-ethylhexyl acrylate (EHA), 2-ethylhexyl methacrylate, octyl (meth)acrylate, decyl (meth)acrylate, isodecyl (meth)acrylate, undecyl (meth)acrylate, dodecyl (meth)acrylate (also known as lauryl (meth)acrylate), tridecyl (meth)acrylate, tetradecyl (meth)acrylate (also known as myristyl (meth)acrylate), pentadecyl (meth)acrylate, hexadecyl (meth)acrylate (also known as cetyl (meth)acrylate), heptadecyl (meth)acrylate, octadecyl (meth)acrylate (also known as stearyl (meth) acrylate), nonadecyl (meth)acrylate, eicosyl (meth)acrylate and combinations thereof. Typically, the ($C_1$-$C_{20}$)alkyl (meth)acrylate esters are ($C_1$-$C_8$)alkyl (meth)acrylate esters and preferably ($C_1$-$C_8$)alkyl acrylate esters; more preferably, the ($C_1$-$C_{20}$)alkyl (meth)acrylate esters are selected from methyl acrylate, ethyl acrylate, butyl acrylate and 2-ethylhexyl acrylate; most preferably, the acrylate esters are selected from butyl acrylate and 2-ethylhexyl acrylate.

The one or more monoethylenically unsaturated monomers used to prepare the water insoluble polymer binders, may comprise one or more vinylaromatic monomers, such as, for example, styrene, alpha-methyl styrene and substituted styrenes, such as vinyl toluene, 2-bromostyrene, 4-chlorostyrene, 2-methoxystyrene, 4-methoxystyrene, alpha-cyanostyrene, allyl phenyl ether and allyl tolyl ether.

It is also possible for the water insoluble polymer resins to comprise, as polymerized units, 0-50%, such as 0-25%, of one or more other copolymerizable monomers. Suitable other copolymerizable monomers include, for example, butadiene, acrylonitrile, methacrylonitrile, crotononitrile, alpha-chloroacrylonitrile, ethyl vinyl ether, isopropyl vinyl ether, isobutyl vinyl ether, butyl vinyl ether, diethylene glycol vinyl ether, decyl vinyl ether, ethylene, methyl vinyl thioether and propyl vinyl thioether, esters of vinyl alcohol, and amides of ethylenically unsaturated ($C_3$-$C_6$)carboxylic acids, amides of ethylenically unsaturated ($C_3$-$C_6$)carboxylic acids that are substituted at the nitrogen by one or two ($C_1$-$C_4$)alkyl groups, acrylamide, methacrylamide and N-methylol (meth)acrylamide.

The aqueous coating composition according to the present invention comprises: from 1 to 95% by weight of an aqueous solvent comprising water; from 5 to 80% by weight of a polymer binder; and from 0.05 to 10% by weight of a water soluble poly(ethylene oxide); all weight percents being based on the total weight of the aqueous coating composition. The aqueous coating compositions of the present invention have a viscosity below 10,000 centipoises. In some embodiments, the aqueous coating composition may comprise from 50 to 95%, or even 75 to 95%, by weight, of the aqueous solvent comprising water.

In some embodiments, the aqueous coating composition may comprise from 10 to 60%, or even 25 to 60%, by weight, of the polymer binder.

In some embodiments, the aqueous coating composition may comprise from 0.05 to 8%, or even 0.1 to 5%, or even 0.1 to 2.5%, by weight, of the water soluble poly(ethylene oxide).

As with other, known aqueous coating compositions, the compositions in accordance with the present invention may contain additional ingredients besides an aqueous solvent comprising water, a water soluble poly(ethylene oxide), and a polymer binder. For example, the coating compositions may also comprise one or more solvents, preservatives, wetting aids, leveling aids, wax emulsions, defoamers and viscosity modifiers, among other things. Most, if not all, such additional components are well-known to persons of ordinary skill in the relevant art and their use is not particularly limited in connection with the present invention. The following information is for general guidance only, since it is believed that persons of ordinary skill are already well-equipped and in the best position to assess which, if any, such additional components, known now or in the future, may be beneficial depending on the particular coating composition and its intended application.

For example, without limitation, suitable solvents include, for example, coalescing solvents and plasticizing solvents. Suitable coalescing solvents, for example, may be selected from Butoxyethyl PROPASOL™, Butyl CARBITOL™, Butyl CELLOSOLVE™ Acetate, Butyl CELLOSOLVE™, Butyl DIPROPASOL™, Butyl PROPASOL™, CARBITOL™ PM-600, CARBITOL™ Low Gravity, CELLOSOLVE™ Acetate, CELLOSOLVE™, Ester EEP™, FILMER IBT™, Hexyl CARBITOL™, Hexyl CELLOSOLVE™, Methyl CARBITOL™, Methyl CELLOSOLVE™ Acetate, Methyl CELLOSOLVE™, Methyl DIPROPASOL™, Methyl PROPASOL™ Acetate, Methyl PROPASOL™, Propyl CARBITOL™, Propyl CELLOSOLVE™, Propyl DIPROPASOL™ and Propyl PROPASOL™, among others, all of which are available from Dow Chemical Company of Midland, Mich., U.S.A.

Suitable plasticizing solvents, for example, may be selected from ethylene glycol phenyl ether (commercially available as "DOWANOL™ EPh" from Dow Chemical Company), propylene glycol phenyl ether (commercially available as "DOWANOL™ PPh" from Dow Chemical Company); 2,2,4-Trimethyl-1,3-pentanediol diisobutyrate; tributoxy ethyl phosphate; dibasic esters such as dimethyl adipate, dimethyl succinate, dimethyl glutarate, dimethyl malonate, diethyl adipate, diethyl succinate, diethyl glutarate, dibutyl succinate, and dibutyl glutarate (including products commercially available under the trade designations DBE, DBE-3, DBE-4, DBE-5, DBE-6. DBE-9, DBE-IB, and DBE-ME from E.I. du Pont de Nemours and Company, of Wilmington, Del., U.S.A.); dialkyl carbonates such as dimethyl carbonate, diethyl carbonate, dipropyl carbonate, diisopropyl carbonate, and dibutyl carbonate; phthalate esters such as dibutyl phthalate, diethylhexyl phthalate, and diethyl phthalate, among others.

Suitable preservatives include KATHON® CG/ICP, KORALONE™ BIT, NEOLONE™ M-10, ROCIMA™586, UCARCIDE™25, UCARCIDE™50, BIOBAN™ BP, BIOBAN™ DXN, BIOBAN™ CS-1135, BIOBAN™ CS-1246, DOWICIDE™ OPP, DOWICIL™75 and DOWICIL™ 150, all of which are available from the Dow Chemical Company, as well as others familiar to persons of ordinary skill.

Resins and emulsions suitable for use in the coating compositions of the present invention include, without limitation, aqueous polyethylene wax dispersions such as those based on A-C® polyethylenes and Acumist® polyethylenes commercially available from Honeywell Corporation of Morristown, N.J., U.S.A.; Epolene® polyethylene polymers, aqueous polypropylene wax dispersions such as those based on Acumist® polypropylenes also commercially available from Honeywell Corporation, and Epolene® maleated polypropylenes from Westlake Chemical of Houston, Tex., U.S.A.; aqueous polyolefin dispersions such as those based on A-C® polyolefins and maleated polyolefins available from Honeywell Corporation; alkali-soluble resins based on the Acrysol® and Rhoplex® emulsions, ASR PLUS S25 all commercially available from Dow Chemical Company; Joncryl® polymers commercially available from BASF of Florham Park, N.J., U.S.A.; aqueous styrene maleic anhydride resins such as those from Sartomer of Exton, Pa., U.S.A.; and aqueous dispersions of rosin esters such as those commercial available from Resinall Corporation of Severn, N.C., U.S.A.; apiphjatic polyester and polycarbonate based polyurethane dispersions (U 410, U 615, U 801, U 910, U 915, U 933), castor oil and linseed oil based polyurethane dispersions (CUR 21 CUR 69, CUR 99, CUR 991, CUR 3), all commercially available from Alberdingk Boley, Inc. of Greensboro, N.C., U.S.A.; and SANCURE® polyurethane dispersions commercially available from Lubrizol of Wickliffe, Ohio, U.S.A.

Defoamers may for example, without limitation, be selected from those known now or in the future to persons of ordinary skill including SILFOAM™ SE-21, commercially available from Wacker Chemical Corporation of Calvert City, Ky., U.S.A.; DEE FO P1-35, available from Munzig Corporation. Of Paterson, N.J., U.S.A.; DOW CORNING® 73 Additive, commercially available from Dow Corning of Midland, Mich., U.S.A.; and BYK Defoamer BYK-024, commercially available from BYK Additives & Instruments of Wallingford, Conn., U.S.A.

The use, application and benefits of the present invention will be clarified by the following discussion and description of exemplary embodiments and applications of the compositions formulations present invention.

EXAMPLES

Sample Formulations

To test the aqueous coating compositions of the invention for their ability to provide reduced gloss, or matt, coatings on leather substrates, sample formulations were prepared according to the details provided in Table 1 and Table 2. After complete mixing (for 30 minutes), the PEO containing formulations were applied to leather pieces obtained from two different batches of natural leather using a 3 mil (0.0762 millimeter) Bird film applicator.

Each of the two leather samples had an area of 232 cm$^2$ and a thickness of 0.32 cm. Leather 1 was cowhide corrected grain leather and Leather 2 was cowhide full grain leather. Both leather samples were purchased from GST AutoLeather, located in Southfield, Mich., U.S.A. The coatings were allowed to dry for seven days at 77° F. (25° C.) and 50% relative humidity. Subsequent coats were applied as specified for the type of evaluation that was going to be performed, i.e., 2-4 coats to determine gloss, and 1 or 2 coats to determine whiteness (L*).

A Gardner Byk Micro-Tri-Gloss meter, catalog number 4520, was used to record 60° and 20° gloss.

L* of the CIELAB (L*,a*,b*) color space was used to indicate whiteness, as measured using the following instrument:
BYK Spectro-Guide 45/0; Cat. No. 6801; Ser. No. 1059451
Manufactured by Byk-Gardner GMBH, 82538 Geretsried, Germany L* is the coordinate on the scale of the three coordinates used in CIELAB that measures lightness (L*=0 yields black, and L*=100 indicates diffuse white). CIELAB is a color space specified by the International Commission on Illumination (French Commission internationale de l'éclairage). It describes all the colors visible to the human eye and was created to serve as an independent model to be used as a reference.

Experimental leather coating compositions were formulated having the components listed in the following TABLE 1 in common, in the listed amounts.

TABLE 1

Standard Test Formulation Components - Leather Coating

| Material In Proper Order of Addition | Description/Function | Percent (By Weight) |
|---|---|---|
| Water | Diluent | 45.5* |
| Additive | Gloss Control | X* |
| KATHON ® CG/ICP | Preservative | 0.04 |
| CAPSTONE ™ FS-60 (1%) | Wetting Aid | 1.0 |
| Diethylene Glycol Ethyl Ether | Coalescing Solvent | 4.0 |
| Dipropylene Glycol Methyl Ether | Coalescing Solvent | 1.0 |
| Benzoflex ® 131 | Plasticizing Solvent | 1.0 |
| Tributoxy Ethyl Phosphate | Leveling Aid | 2.0 |
| Polymer (38%)** | Vehicle | 36.67 |
| Chemrez 30 (30%) | Alkali-Soluble Resin | 2.84 |
| Epolene ® E-43N (40%) | Polypropylene Wax Emulsion | 2.63 |
| A-C ®-325N (35%) | Polyethylene Wax Emulsion | 3.30 |
| SilFoam ® SE-21 | Defoamer | 0.02 |

*Water charge adjusted to provide was adjusted to provide the total weight of the ingredients to be 100 grams, i.e., a 100% by weight formulation, when additive added.
**Polymer Vehicle was a polymer prepared in accordance with the emulsion method described in U.S. Pat. No. 6,548,596, which is incorporated herein by reference. This polymer vehicle had a $T_g$ of 71.1° C. and comprised:
33% Butyl Methacrylate
10% Isobutyl Methacrylate
45% Styrene
12% Methacrylic Acid
1.5% zinc
$T_{g(Fox)}$ = 71.1° C.

The sample aqueous coating compositions were prepared using the aforesaid standard test formulation components and various types and amounts of matting agents as indicated in TABLE 2 below.

TABLE 2

Matting Agents Used In Aqueous Coating Composition Examples

| Composition # | PEO Matting Agent | Amount (grams) |
|---|---|---|
| 1 | none | standard |
| 2 | POLYOX WSR N-10 | 0.25 |
| 3 | POLYOX WSR N-205 | 0.25 |

The gloss and L* measurement results are presented in Table 3 below.

TABLE 3

Leather Coating Gloss and L* Results

| Example Number | Comp. 1* | Comp. 2* | 3 | 4 |
|---|---|---|---|---|
| Composition # | 1 | 1 | 2 | 3 |
| Substrate | Leather 1 | Leather 2 | Leather 1 | Leather 2 |
| Property Measured | | | | |
| 0 coat L* value | 64.27 | 48.88 | | |
| 1 coat L* value | | | 70.45 | 60.34 |
| 2 coat L* value | | | 75.31 | 66.21 |
| 0 coat 60° Gloss | 9.6 | 8.0 | | |
| 0 coat 20° Gloss | 1.1 | 1.0 | | |
| 1 coat 60° Gloss | 19 | 17 | | |
| 1 coat 20° Gloss | 3.0 | 2.7 | | |
| 2 coat 60° Gloss | 29 | 25 | 12 | 8.3 |
| 2 coat 20° Gloss | 6.6 | 5.1 | 1.3 | 1.0 |

*Comparative examples

What is claimed is:

1. An aqueous coating composition for treating leather comprising:
    A) 1 to 94.95% by weight of an aqueous solvent comprising water;
    B) 5 to 80% by weight of a polymer binder comprising polymerized units derived from one or more ethylenically unsaturated monomers, an acid-functional residue, and a polyvalent metal ion; and
    C) 0.05 to 10% by weight of a water soluble poly(ethylene oxide) resin having the general formula [—CH$_2$CH$_2$O—]$_n$, wherein n is selected to provide a weight average molecular weight of 100,000 to 1,000,000 grams per mole of the water soluble poly(ethylene oxide),
    wherein the water soluble poly(ethylene oxide) resin optionally comprises polymerized units derived from propylene oxide, and
    wherein a coating of the aqueous coating composition provides a 60° gloss of 8.3 to 12 and a whiteness of 66.21 to 75.31, wherein the gloss and whiteness are determined on a two-coat coating on leather.

2. The coating composition according to claim 1, wherein said water soluble poly(ethylene oxide) resin comprises polymerized units derived from ethylene oxide and propylene oxide.

3. The coating composition according to claim 1, comprising 0.1 to 5% by weight of said water soluble poly(ethylene oxide).

4. The coating composition according to claim 1, comprising 10 to 60% by weight of said polymer binder.

5. The coating composition according to claim 1, comprising 75 to 94.95% by weight of said aqueous solvent comprising water.

6. The coating composition according to claim 1, further comprising one of more of the following additional components: solvents, preservatives, wetting aids, leveling aids, wax emulsions, defoamers and viscosity modifiers.

7. A method for providing a low gloss coating to natural or synthetic leather, comprising applying one or more layers to a leather substrate of the coating composition of claim 1, and allowing each layer to dry prior to use or application of another layer.

8. The coating composition according to claim 1, comprising 0.1 to 2.5% by weight of said water soluble poly(ethylene oxide).

9. The coating composition according to claim 1, wherein the ethylenically unsaturated monomers comprise a $(C_1-C_{20})$ alkyl (meth)acrylate ester monomer.

10. The coating composition according to claim 9, wherein the $(C_1-C_{20})$alkyl (meth)acrylate ester monomer is butyl methacrylate, isobutyl methacrylate, or a combination thereof.

11. The coating composition according to claim 1, wherein the acid functional residue is acrylic acid, methacrylic acid, maleic acid, itaconic acid, or a combination thereof.

12. The coating composition according to claim 11, wherein the acid functional monomer is present in an amount of 5 to 90 percent by weight of the polymer binder.

13. The coating composition according to claim 1, wherein the polyvalent metal ion is zinc.

* * * * *